US012460233B2

(12) United States Patent
Goeke et al.

(10) Patent No.: US 12,460,233 B2
(45) Date of Patent: Nov. 4, 2025

(54) PRODUCTION OF GUAIENE AND ROTUNDONE

(71) Applicant: Givaudan SA, Vernier (CH)

(72) Inventors: Andreas Goeke, Dübendorf (CH); Julie Charpentier, Zürich (CH); Boris Schilling, Knonau (CH); Fridtjof Schröder, Hettlingen (CH)

(73) Assignee: Givaudan SA, Vernier (CH)

( * ) Notice: Subject to any disclaimer, the term of this patent is extended or adjusted under 35 U.S.C. 154(b) by 265 days.

(21) Appl. No.: 17/936,072

(22) Filed: Sep. 28, 2022

(65) Prior Publication Data

US 2023/0040990 A1 Feb. 9, 2023

Related U.S. Application Data

(63) Continuation of application No. 16/765,649, filed as application No. PCT/EP2018/082007 on Nov. 21, 2018, now Pat. No. 11,485,985.

(30) Foreign Application Priority Data

Dec. 5, 2017 (EP) .................................... 17205361

(51) Int. Cl.
C12P 7/38 (2006.01)
A23L 27/10 (2016.01)
A23L 27/20 (2016.01)
C07C 45/27 (2006.01)
C12N 9/88 (2006.01)

(52) U.S. Cl.
CPC ................ C12P 7/38 (2013.01); A23L 27/10 (2016.08); A23L 27/203 (2016.08); C07C 45/27 (2013.01); C12N 9/88 (2013.01); A23V 2002/00 (2013.01)

(58) Field of Classification Search
None
See application file for complete search history.

(56) References Cited

U.S. PATENT DOCUMENTS

| | | | |
|---|---|---|---|
| 10,392,673 B2 | 8/2019 | Kino et al. | |
| 2013/0172625 A1 | 7/2013 | Tarbit et al. | |

FOREIGN PATENT DOCUMENTS

| | | | |
|---|---|---|---|
| EP | 0527623 A2 | 2/1993 | |
| EP | 3255151 A2 | 12/2017 | |
| JP | H05246913 A | 9/1993 | |
| JP | 2013534927 A | 9/2013 | |
| WO | 2005052163 A2 | 6/2005 | |
| WO | 2012001018 A1 | 1/2012 | |

OTHER PUBLICATIONS

Damian Paul Drew, Two key polymorphisms in a newly discovered allele of the Vitis vinifera TPS24 gene are responsible for the production of the rotundone precursor α-guaiene, Journal of Experimental Botany, Nov. 17, 2015, pp. 799-808, vol. 67, No. 3.
XP002783297, Database EMBL [Online], Database Accession No. GU083698, Aquilaria crassna delta-guaiene synthase c(3) mRNA, complete cds, Nov. 4, 2009.
XP055494816, Kumeta et al., Characterization of delta-guaiene Synthases from Cultured Cells of Aquilaria, Responsible for the Formation of Sesquiterpenes in Agarwood, Plant Physiology, pp. 1998-2007, Oct. 19, 2010, vol. 154, No. 4.
Fulvio Mattivi, Key enzymes behind black pepper aroma in wines, Journal of Experimental Botany, pp. 555-557, Feb. 2, 2016, vol. 67, No. 3.
International Search Report for PCT/EP2018/082007 dated Mar. 28, 2019.
Written Opinion for PCT/EP2018/082007 dated Mar. 28, 2019.
Extended Search Report for EP 17205361.3 dated Aug. 6, 2018.
Fabienne Deguerry, et al., The diverse sesquiterpene profile of patchouli, Pogostemon cablin, is correlated with a limited number of sesquiterpene synthases, Archives of Biochemistry and Biophysics, Aug. 23, 2006, pp. 123-126, vol. 454, Elsevier Inc.
Arctander, 1994, vol. I.
Tatiana A. Tatusova, et al., Blast 2 Sequences, a new tool for comparing protein and nucleotide sequences, FEMS Microbiology Letters, Mar. 18, 1999, pp. 247-250, vol. 174, Elsevier Science B.V.
Firmenich SA, Clearwood Technical disclosure, by Firmenich SA, IP.com No. IPCOM000233341D, Dec. 9, 2013.
Claudia Wood, et al., From Wine to Pepper: Rotundone, an Obscure Sesquiterpene, Is a Potent Spicy Aroma Compound, Journal of Agricultural and Food Chemistry, 2008, pp. 3738-3744, vol. 56, Issue 10, American Chemical Society.
An-Cheng Huang, et al., Production of the Pepper Aroma Compound, (-)-Rotundone, by Aerial Oxidation of a-Guaiene, Journal of Agricultural and Food Chemistry, Oct. 11, 2014, pp. 10809-10815, vol. 62, ACS Publications.
Akira Nakanishi, et al., Identification of Rotundone as a Potent Odor-Active Compound of Several Kinds of Fruits, Journal of Agricultural and Food Chemistry, May 18, 2017, pp. 4464-4471, vol. 65, ACS Publications.
Hideki Takase, et al., Cytochrome P450 CYP71BE5 in grapewine (Vitis vinifera) catalyzes the formation of the spicy aroma compound (-)-rotundone, Journal of Experimental Botany, 2016, pp. 787-798, vol. 67, Oxford University Press.
An-Cheng Huang, et al., Mechanistic Studies on the Autoxidation of a-Guaiene: Structural Diversity of the Sesquiterpenoid Downstream Products, Journal of Natural Products, Jan. 12, 2015, pp. 131-145, vol. 78, ACS Publications.
Evan J. Horn, et al., Scalable and sustainable electrochemical allylic C—H oxidation, Nature, May 5, 2016, pp. 77-81, vol. 533, MacMillan Publishers Limited.

(Continued)

Primary Examiner — Anand U Desai
(74) Attorney, Agent, or Firm — Curatolo Sidoti & Trillis Co., LPA; Floyd Trillis, III; Salvatore A. Sidoti

(57) ABSTRACT

A process for producing rotundone from α-guaiene, in particular by oxidation of the C(3) position, wherein the α-guaiene is produced from a precursor by a sesquiterpene synthase. The sesquiterpene synthase is produced in a microorganism.

12 Claims, No Drawings
Specification includes a Sequence Listing.

(56) References Cited

OTHER PUBLICATIONS

Filiz Yesilirmak, et al., Heterelogous Expression of Plant Genes, International Journal of Plant Geonomics, pp. 1-16, 2009, vol. 2009, Article ID 296482, Hindawi Publishing Corporation.
Mattivi, et al., "Effective analysis of rotundone at below-threshold levels in red and white wines using solid-phase microextraction gas chromatography/tandem mass spectrometry", Rapid Commun. Mass, Spectrom., 2011, vol. 25, pp. 483-488.
Martin, et al., "The in vivo synthesis of plant sesquiterpenes by *Escherichia coli*", Biotechnology and Bioengineering, Dec. 5, 2001, pp. 497-503, vol. 75, No. 5.
Ajikumar, et al., "Terpenoids: Opportunities for biosynthesis of natural product drugs using engineered microorganisms", Molecular Pharmaceutics, Jun. 9, 2008, vol. 5, No. 2, pp. 167-190.

SEQUENCE LISTING

Sequence total quantity: 6
SEQ ID NO: 1     moltype = DNA   length = 1686
FEATURE          Location/Qualifiers
source           1..1686
                 mol_type = genomic DNA

```
                        organism = Vitis vinifera
SEQUENCE: 1
atgtctgttc cactatcagt ctcagtcact cctatactaa gccagaggat tgatcctgag    60
gtggctcgcc acgaagccac atatcatcct aacttctggg gtgatcgttt cctccactac   120
aatcctgatg atgatttctg tggaacccat gcttgtaaag aacaacaaat tcaagaactg   180
aaagaagaag tgcggaagag cctggaagct actgctggga acacttcaca gctgctgaag   240
ttgatagatt ccatccaacg cttgggattg gcttaccact tgaaaggga gattgaagaa   300
gcattgaagg ccatgtatca aacttatact ctggttgatg ataatgatca cctcactaca   360
gtttcccttc tgttccgact actaagacag gaaggttacc acattccatc agatgtattt   420
aagaagttca tggatgaggg aggcaacttc aaggaatcat tggtgggtga cttaccaggc   480
atgctagctt tatatgaagc tgcacattta atggtgcatg gagaagacat actagatgaa   540
gccctgggtt tcaccactgc tcaccttcag tccatggcaa ttgattcaga taatcctctc   600
acaaaacaag tgattcgtgc tctaaagcgc ccgattcgca agggcttacc aagggtggag   660
gcaaggcatt acattaccat ctaccaagaa gacgattcac ataatgaatc tttactcaag   720
cttgcaaagt tggattacaa catgttgcag tcactccaca ggaaagagct aagtgagatc   780
actaagtggt ggaaaggttt agactttgcg acaaagctac cttttgcgag ggacaggata   840
gtggaaggct acttttggat cttgggagtg tactttgaac cccaatatta ccttgctaga   900
aggatcttaa tgaaagtatt cggggtgcta tccattgtag atgatatata tgatgcgtat   960
gggacatttg aagaactcaa actctttaca gaagcaattg agatgggat gccagcagc  1020
atagatcaac tgccagatta tatgaaggtg tgttatcagg ctctcttaga tgtctatgaa  1080
gaaatggagg aagagatgac gaagcaagga aaactgtacc gtgttcacta cgcacaagca  1140
gcgttaaaaa ggcaagtcca agcctacctt cttgaagcca aatggttgaa gcaagaatat  1200
ataccaacaa tggaagagta catgagcaac gcgctggtaa cgtctgcctg ctctatgctt  1260
acaaccacat ctttcgtcgg tatgggagat atggtaacca aggaggcctt cgattgggtt  1320
ttcagtgacc ctaagatgat tagagcttca aacgtcattt gcaggcttat ggatgacata  1380
gtttcccatg agtttgagca aaaaagaggg catgttgcct cagccgtaga atgctacatg  1440
gtgcaatatg gggttttcaa ggaagaagct tatgatgagt tcaagaagca agtagagagt  1500
gcatggaagg ataataatga ggagttcctg caacctacag cagtgccagt tccactcctc  1560
acccgtgttc tgaattttag ccggatggtg gacgtcttgt acaaggacga agatgagtac  1620
acgctggttt gaccattgat gaaagatctg gttgcaggga tgctcataga tcctgtgcca  1680
atgtaa                                                             1686

SEQ ID NO: 2           moltype = AA  length = 561
FEATURE                Location/Qualifiers
source                 1..561
                       mol_type = protein
                       organism = Vitis vinifera
SEQUENCE: 2
MSVPLSVSVT PILSQRIDPE VARHEATYHP NFWGDRFLHY NPDDDFCGTH ACKEQQIQEL    60
KEEVRKSLEA TAGNTSQLLK LIDSIQRLGL AYHFEREIEE ALKAMYQTYT LVDDNDHLTT   120
VSLLFRLLRQ EGYHIPSDVF KKFMDEGGNF KESLVGDLPG MLALYEAAHL MVHGEDILDE   180
ALGFTTAHLQ SMAIDSDNPL TKQVIRALKR PIRKGLPRVE ARHYITIYQE DDSHNESLLK   240
LAKLDYNMLQ SLHRKELSEI TKWWKGLDFA TKLPFARDRI VEGYFWILGV YFEPQYYLAR   300
RILMKVFGVL SIVDDIYDAY GTFEELKLFT EAIERWDASS IDQLPDYMKV CYQALLDVYE   360
EMEEEMTKQG KLYRVHYAQA ALKRQVQAYL LEAKWLKQEY IPTMEEYMSN ALVTSACSML   420
TTTSFVGMGD MVTKEAFDWV FSDPKMIRAS NVICRLMDDI VSHEFEQKRG HVASAVECYM   480
KQYGVSKEEA YDEFKVQVES AWKDNNEEFL QPTAVPVPLL TRVLNFSRMV DVLYKDEDEY   540
TLVGPLMKDL VAGMLIDPVP M                                             561

SEQ ID NO: 3           moltype = DNA  length = 1644
FEATURE                Location/Qualifiers
source                 1..1644
                       mol_type = genomic DNA
                       organism = Aquilaria
SEQUENCE: 3
atgtcttcgg caaaactagg ttctgcctcc gaagatgtta gccgccgaga tgccaattac    60
catcccaccg tttgggggga cttttttcctc actcattctt ccaacttctt ggaaaataac   120
gacagcatcc ttgaaaaaca tgaggagttg aaacaagaag tgagaaactt gttggtagtt   180
gaaacaaagtg atcttccaag caagatccaa ttgactgacg aaatcattcg tctgggcgtt   240
ggatatcatt ttgagacgga gatcaaagct caactggaga aattgcatga tcaccaactt   300
catctcaatt tcgatctcct cacgacatcc gtttggtttc ggttgcttcg aggacacgga   360
ttctctattc catccgatgt gttcaaaaga ttcaagaaca caaagggtga attcgagact   420
gaggatgcga ggactttgtg gtgtttgtat gaagcaacac atctaagagt tgatggtgaa   480
gatatattgg aagaagccat tcaatttttca aggaaaagat tgggctct cttgccgaaa   540
ttaagcttcc ctctcagcga atgcgtgagg gacgctcttc acattcctta ccaccggaat   600
gttcaaaggt tggctgcaag gcaatacatt ccccaatatg acgcagaaca aacaaagatc   660
gagtcattgt ccttgtttgc caaatcgac tttaacatgt tgcaagcttt acaccaaagt   720
gaactaagag aagcttctcg ttggtggaag gaatttgatt ttccatccaa gcttccttat   780
gcaagagaca gaattgctga aggctactac tggatgatgg gtgccattt ttgagcctaaa   840
ttctctctta gtagaaaatt tctcaataga atagttggga ttacttctct aatcgatgac   900
acatatgatg tttatggcac attggaagaa gttacgttgt tcactgaagc agtcgagagg   960
tgggacattg aagctgtaaa agatattcct aaatacatgc aagtaattta cattggtatg  1020
ttgggcattt ttgaagattt caaggacaat ctgatcaatc aagagggaaa agactattgc  1080
attgattatg cgatagaagt gtttaaggag attgtcaagc cttacaaag agaagcagag  1140
tattccacaa ctggatatgt gcctagttat gacgagtaca tggagaactc cataatagt  1200
ggtgggtaca agatgttcat tattcgatgg ttgattggaa gggaaggagtt tgaactcaag  1260
gaaactctag attgggcttc gacaatccca gaaatggtca agcttcttc gcttatcgct  1320
cgttatattg atgaccttca gacctacaag gccgaagagg aaagaggga aaccgtttcg  1380
gccggtgcgg ttacatgag ggagtttggc gtttcagaag aacaggcatg caagaagatg  1440
```

```
agggagatga ttgagatcga gtggaaaaga ctgaacaaga cgaccctaga ggcggatgaa  1500
atctcttcgt cggttgtgat cccatcccta aatttcactc gagtgttgga ggtgatgtac  1560
gataaaggtg atggatacag cgattctcaa ggcgtgacca aggatagaat tgctgccttg  1620
ttgcgtcatg ctattgaaat ctga                                          1644

SEQ ID NO: 4         moltype = AA   length = 547
FEATURE              Location/Qualifiers
source               1..547
                     mol_type = protein
                     organism = Aquilaria
SEQUENCE: 4
MSSAKLGSAS EDVSRRDANY HPTVWGDFFL THSSNFLENN DSILEKHEEL KQEVRNLLVV    60
ETSDLPSKIQ LTDEIIRLGV GYHFETEIKA QLEKLHDHQL HLNFDLLTTS VWFRLLRGHG   120
FSIPSDVFKR FKNTKGEFET EDARTLWCLY EATHLRVDGE DILEEAIQFS RKRLEALLPK   180
LSFPLSECVR DALHIPYHRN VQRLAARQYI PQYDAEQTKI ESLSLFAKID FNMLQALHQS   240
ELREASRWWK EFDFPSKLPY ARDRIAEGYY WMMGAHFEPK FSLSRKFLNR IVGITSLIDD   300
TYDVYGTLEE VTLFTEAVER WDIEAVKDIP KYMQVIYIGM LGIFEDFKDN LINARGKDYC   360
IDYAIEVFKE IVRSYQREAE YFHTGYVPSY DEYMENSIIS GGYKMFIILM LIGRGEFELK   420
ETLDWASTIP EMVKASSLIA RYIDDLQTYK AEEERGETVS AVRCYMREFG VSEEQACKKM   480
REMIEIEWKR LNKTTLEADE ISSSVVIPSL NFTRVLEVMY DKGDGYSDSQ GVTKDRIAAL   540
LRHAIEI                                                              547

SEQ ID NO: 5         moltype = DNA   length = 1659
FEATURE              Location/Qualifiers
source               1..1659
                     mol_type = genomic DNA
                     organism = Pogostemon cablin
SEQUENCE: 5
atggagttgt atgcccaaag tgttggagtg ggtgctgctt ctcgtcctct tgcgaatttt    60
catccatgtg tgtggggaga caaattcatt gtctacaacc cacaatcatg ccaggctgga   120
gagagagaag aggctgagga gctgaaagtg gagctgaaaa gagagctgaa ggaagcatca   180
gacaactaca tgcggcaact gaaaatggtg gatgcaatac aacgattagg cattgactat   240
cttttttgtg gaagatgttga tgaagctttg aagaatctgt ttgaaatgtt tgatgcttttc  300
tgcaagaata tccatgacat gcacgccact gctctcagct ttcgccttct cagacaacat   360
ggatacagag tttcatgtga agttttttgaa aagtttaagg atggcaaaga tggatttaag   420
gttccaaatg aggatggagc ggttgcagtc cttgaattct tcgaagccac gcatctcaga   480
gtccatggag aagacgtcct tgataatgct tttgacttca ctaggaacta cttggaatca   540
gtctatgcaa ctttgaacga tccaacccgc aaacaagtgc acaacgcatt gaatgagttc   600
tcttttcgaa gaggattgcc acgcgtggaa gcaaggaagt acatatcaat ctacgagcaa   660
tacgcatctc atcacaaagg cttgctcaaa cttgctaagc tggatttcaa cttggtacaa   720
gctttgcaca aagggagct gagtgaagat tctaggtggt ggaagacttt acaagtgccc   780
acaaagctat cattcgttag agatcgattg gtggagtcct acttctgggc ttcgggatct   840
tatttcgaac cgaattattc ggtagctagg atgattttag caaagggtct ggctgtatta   900
tctcttatgg atgatgtgta tgatgcatat ggtacttttg aggaattaca aatgttcaca   960
gatgcaatcg aaaggtggga tgcttccatg ttagataaac ttccagatta catgaaaata  1020
gtatacaagg cccttttgga tgtgtttgag gaagttgacg aggagttgat caagctaggc  1080
gcaccatatc gagcctacta tggaaaagaa gccatgaaat acgccgcgag agcttacatg  1140
gaagaggccc aatggaggga gcaaaagcac aaacccacaa ccaaggagta tatgaagctg  1200
gcaaccaaga catgtggcta cataactcta ataatattat catgtcttgg agtgaagag   1260
ggcattgtga ccaaagaagc cttcgattgg gtgttctccc gacctccttt catcgaggct  1320
acattaatca ttgccaggct cgtcaatgat attacaggac acgagtttga gaaaaaacga  1380
gagcacgttc gcactgcagt agaatgctac atggaagagc acaaagtggg gaagcaagag  1440
gtggtgtctg aattctacaa ccaaatggag tcagcatgga ggacattaa tgagggcttc  1500
ctcagaccag ttgaatttcc aatccctcta ctttatctta ttctcaattc agtccgaaca  1560
cttgaggtta tttacaaaga gggcgattcg tatacacacg tgggtcctgc aatgcaaaac  1620
atcatcaagc agttgtacct tcaccctgtt ccatattaa                          1659

SEQ ID NO: 6         moltype = AA   length = 552
FEATURE              Location/Qualifiers
source               1..552
                     mol_type = protein
                     organism = Pogostemon cablin
SEQUENCE: 6
MELYAQSVGV GAASRPLANF HPCVWGDKFI VYNPQSCQAG EREEAEELKV ELKRELKEAS    60
DNYMRQLKMV DAIQRLGIDY LFVEDVDEAL KNLFEMFDAF CKNHDMHAT ALSFRLLRQH   120
GYRVSCEVFE KFKDGKDGFK VPNEDGAVAV LEFFEATHLR VHGEDVLDNA FDFTRNYLES   180
VYATLNDPTA KQVHNALNEF SFRRGLPRVE ARKYISIYEQ YASHHKGLLK LAKLDFNLVQ   240
ALHRRELSED SRWWKTLQVP TKLSFVRDRL VESYFWASGS YFEPNYSVAR MILAKGLAVL   300
SLMDDVYDAY GTFEELQMFT DAIERWDASC LDKLPDYMKI VYKALLDVFE EVDEELIKLG   360
APYRAYYGKE AMKYAARAYM EEAQWREQKH KPTTKEYMKL ATKTCGYITL IILSCLGVEE   420
GIVTKEAFDW VFSRPPFIEA TLIIARLVND ITGHEFEKKR EHVRTAVECY MEEHKVGKQE   480
VVSEFYNQME SAWKDINEGF LRPVEFPIPL LYLILNSVRT LEVIYKEGDS YTHVGPAMQN   540
IIKQLYLHPV PY                                                        552
```

PRODUCTION OF GUAIENE AND ROTUNDONE

CROSS REFERENCE TO RELATED APPLICATIONS

This application is a continuation application of U.S. Ser. No. 16/765,649, filed May 20, 2020, which is a U.S. National Stage Application of International Application No. PCT/EP2018/082007, filed Nov. 21, 2018, which claims priority from European Patent Application No. 17205361.3, filed Dec. 5, 2017, all of which applications are incorporated herein by reference in their entireties.

The contents of the electronic sequence listing (GIVP30932A_XMLSEQ; Size: 12,812 bytes; and Date of Creation: Sep. 22, 2022) are herein incorporated by reference in its entirety.

The present invention relates to a process for producing rotundone from α-guaiene, to a use of α-guaiene for producing rotundone, to fragrance or flavor ingredients and to a use of such fragrance or flavor ingredients.

Rotundone ((3S,5R,8S)-3,8-dimethyl-5-prop-1-en-2-yl-3,4,5,6,7,8-hexahydro-2H-azulen-1-one) is a sesquiterpene originally discovered in the tubers of Cyperus rotundus. The compound has a strong spicy peppercorn aroma and a woody odor. It was later also found to be a constituent of black and white pepper, marjoram, oregano, rosemary, basil, thyme, geranium, agarwood, patchouli oil and cypriol oil. Furthermore, rotundone was detected in various wines that exhibit peppery spicy notes, mainly Syrah (Shiraz) wines. The sesquiterpene has an aroma detection threshold in water of 8 ng/L, which is amongst the lowest for any natural product yet discovered (*J. Agric. Food Chem.* 2008, 56, 3738-3744 and references cited therein).

Moreover, an investigation of the aromas of grapefruit, orange, apple, and mango revealed the presence of rotundone. Sensory analyses showed that the compound, when added at even subthreshold levels to model beverages of these fruits, did not confer directly a woody odor, but had significant effects on the overall flavors of the beverages, helping them to better approximate the natural flavors of the fruits (*J. Agric. Food Chem.* 2017, 65, 4464-4471).

Despite these highly attractive properties, rotundone has not been used as an ingredient in the fragrance and flavor industry thus far. A main reason for this is the fact that there is no reliable process for the production of sufficient amounts of this material in the desired olfactive quality.

It is surmised that in nature rotundone is formed from α-guaiene by allylic oxidation of the C(3) position, either by aerial oxidation, reactive oxygen species (ROS) or enzymatic oxidation (*J. Agric. Food Chem.* 2014, 62, 10809-10815; *J. Nat. Prod.* 2015, 78, 131-145; *J. Exp. Bot.* 2016, 67, 787-798). This transformation can also be achieved by means of chemical synthesis.

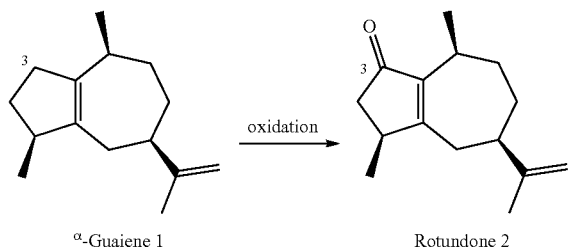

α-Guaiene 1    oxidation    Rotundone 2

α-Guaiene is a constituent of various essential oils, such as guaiacwood oil or patchouli oil. Although it is widely employed in the field of fragrances and flavors, it hitherto could not be used as a precursor for the industrial production of rotundone. First of all, there are serious limitations in the supply of plant materials, from which α-guaiene can be extracted, as many of these are harvested from endangered species, the exploitation of which is under strict control. Furthermore, the separation of α-guaiene from plant extracts is difficult and a major hurdle to access this precursor. Also, the quality of such extracts often suffers from considerable fluctuations. For example, the odor of guaiacwood has been reported to be accompanied by a "smoked ham"-like odor, conceivably acquired during forced distillation of the guaiacwood in adding mineral acid to the distillation water in order to increase the yield and speed of the distillation (S. Arctander, *Perfume and Flavor Materials of Natural Origin* 1994, Allured Publishing Corporation, Carol Stream, IL, USA). The impurities causing this "smoked ham"-like odor are difficult to separate, either from α-guaiene or from rotundone after conversion.

It is therefore a problem underlying the present invention to overcome the above-mentioned shortcomings in the prior art. In particular, it is a problem underlying the present invention to provide a process for the production of rotundone for use in the fragrance and flavor industry, more specifically in the substantial absence of impurities causing a disturbing odor, in particular of the above mentioned "smoked ham"-like odor. Advantageously, this process is supposed to allow for the production of significant quantities of rotundone. Furthermore, the process should be environmentally friendly, safe and cost-efficient.

These problems are solved by a process according to claim 1. In this process, rotundone is produced from α-guaiene, in particular by oxidation of the C(3) position. The α-guaiene is produced from a precursor by a sesquiterpene synthase, wherein the sesquiterpene synthase is produced in a microorganism.

In the context of the present invention, the term "sesquiterpene synthase" refers to a polypeptide capable of effecting the synthesis of the sesquiterpene α-guaiene from a precursor.

Furthermore, that "the α-guaiene is produced from a precursor by a sesquiterpene synthase" is to be understood that the precursor and the sesquiterpene synthase are brought in contact with each other in order to effect the formation of α-guaiene.

Another aspect of the present invention refers to a process for producing rotundone comprising the steps of:
Producing a sesquiterpene synthase in a microorganism;
Producing α-guaiene by bringing the sesquiterpene synthase obtained into contact with a precursor;
Producing rotundone from the α-guaiene obtained, in particular by oxidation of the C(3) position.

By use of a sesquiterpene synthase that is produced in a microorganism, α-guaiene can be obtained independently from naturally sourced raw materials, more specifically through a biotechnological process. Without this constraint, significant quantities of rotundone can be produced at industrial scale with no limitations in volumes, using an environmentally friendly process. This allows for the sustainable production of this compound, in particular as an ingredient in the fragrance and flavor industry. Furthermore, due to the fact that no extraction of plant material is necessary, the α-guaiene required can be furnished under controlled conditions in stable quality and in the substantial absence of impurities causing a disturbing odor, in particular of the above mentioned "smoked ham"-like odor.

The microorganism can be cultured under conditions suitable to produce α-guaiene, in particular in vivo. This has the advantage that the production of both of the sesquiterpene synthase and the α-guaiene can be effected in the same biotransformation, which makes the overall process more efficient. Furthermore, isolation of the sesquiterpene synthase is avoided.

In a preferred embodiment, the microorganism is cultured under conditions suitable to also produce the precursor, in particular from a sugar. Examples of suitable sugars include, but are not limited to, sucrose, fructose, xylose, glycerol, glucose, cellulose, starch, cellobiose and other glucose containing polymers.

On the other hand, the sesquiterpene synthase can also be isolated from the microorganism prior to the production of α-guaiene. Although an additional transformation is then required, the formation of the α-guaiene can then be effected ex vivo under more controlled conditions.

The sesquiterpene synthase required to effect the formation of α-guaiene ex vivo can be obtained by extraction from any microorganism expressing it, using standard protein or enzyme extraction technologies. If the microorganism is a cell releasing the sesquiterpene synthase into the culture medium, the sesquiterpene synthase may simply be collected from the culture medium, for example by centrifugation, optionally followed by washing steps and re-suspension in suitable buffer solutions. If the microorganism accumulates the polypeptide within itself, the sesquiterpene synthase may be obtained by disruption or lysis of the cells and further extraction of the polypeptide from the cell lysate.

The sesquiterpene synthase, either in isolated form or together with other proteins, for example in a crude protein extract obtained from the cultured microorganism, may then be suspended in a buffer solution at optimal pH. If adequate, salts, BSA and other kinds of enzymatic co-factors, may be added in order to optimize enzyme activity. In particular, the enzymatic co-factor can be a $Mg^{2+}$ salt.

The precursor may then be added to the suspension or solution, which is then incubated at optimal temperature, for example between 15 and 40° C., preferably between 25 and 35° C., more preferably at 30° C. After incubation, the α-guaiene, and optionally the other sesquiterpene byproducts may be isolated from the incubated solution by standard isolation procedures, such as solvent extraction and distillation, optionally after removal of polypeptides from the solution.

The microorganism can be a recombinant microorganism. The term "recombinant microorganism" refers to a microorganism that is transformed to express the sesquiterpene synthase, preferably under conditions conductive to the production of α-guaiene. The term "transformed" refers to the fact that the microorganism was subjected to genetic engineering. Preferably, the microorganism is heterologously expressing the sesquiterpene synthase or even overexpressing it. There are several methods known in the art for the creation of transgenic microorganisms.

The recombinant microorganism can be a bacterium or a yeast. More specifically, the microorganism can be selected from the group consisting of *Escherichia coli, Arxula adeninivorans, Candida boidinii, Hansenula polymorpha, Kluyveromyces lactis, Pichia pastoris, Saccharomyces cerevisiae* and *Yarrowia lipolytica*.

Preferably, the *Escherichia coli* used is recognized by the industry and regulatory authorities (including but not limited to an *Escherichia coli* K12 or an *Escherichia coli* BL21).

The precursor can be an acyclic precursor, in particular farnesyl pyrophosphate. In a preferred embodiment of the present invention, wherein the α-guaiene is formed in vivo, the microorganism is also capable of producing farnesyl pyrophosphate, preferably from a sugar.

The sesquiterpene synthase can have a sequence identity with SEQ ID NO.: 2, SEQ ID NO.: 4 or SEQ ID No.: 6 of at least 70%, preferably at least 80%, more preferably at least 90%, even more preferably at least 95%.

SEQ ID NO.: 2 corresponds to the enzyme VvGuaS, which was obtained from *Vitis vinifera*, as described in *J. Exp. Bot.* 2016, 67, 799-808. SEQ ID NO.: 1 represents the corresponding nucleic acid sequence. VvGuaS has been shown to produce α-guaiene as a main product with 45% selectivity.

SEQ ID NO.:4 corresponds to the enzyme AcC3, which was obtained from *Aquilaria* plants, as described in *Plant Physiol.* 2010, 154, 1998-2007. SEQ ID NO.: 3 represents the corresponding nucleic acid sequence. AcC3 has been shown to produce α-guaiene with 45% electivity.

SEQ ID NO.: 6 corresponds to the enzyme PatTps717, which was obtained from *Pogostemon cablin* (patchouli), as described in *Arch. Biochem. Biophys.* 2006, 454, 123-136. SEQ ID NO.: 5 represents the corresponding nucleic acid sequence (cf. also NCBI GenBank accession number AY508730 {Version: AY508730.1}). PatTps717 has been shown to produce α-guaiene with 13% selectivity.

The sequence identity between two peptidic or nucleotidic sequences is a function of the number of amino acids or nucleotide residues that are identical in the two sequences when an alignment of these two sequences has been generated. Identical residues are defined as residues that are the same in the two sequences in a given position of the alignment. The percentage of sequence identity, as used herein, is calculated from the optimal alignment by taking the number of residues identical between two sequences dividing it by the total number of residues in the shortest sequence and multiplying by 100. The optimal alignment is the alignment in which the percentage of identity is the highest possible. Gaps may be introduced into one or both sequences in one or more positions of the alignment to obtain the optimal alignment. These gaps are then taken into account as non-identical residues for the calculation of the percentage of sequence identity.

Alignment for the purpose of determining the percentage of amino acid or nucleic acid sequence identity can be achieved in various ways using computer programs and for instance publicly available computer programs. Preferably, the BLAST program (*FEMS Microbiol Lett.* 1999, 174, 247-250) set to the default parameters, available from the National Center for Biotechnology Information (NCBI) can be used to obtain an optimal alignment of peptidic or nucleotidic sequences and to calculate the percentage of sequence identity.

In the context of the present invention, another microorganism can be transformed capable of producing the sesquiterpene synthase with at least one nucleic acid encoding the sesquiterpene synthase.

The at least one nucleic acid can have a sequence identity with SEQ ID NO.: 1, SEQ ID NO.: 3 or SEQ ID No.: 5 of at least 70%, preferably at least 80%, more preferably at least 90%, even more preferably at least 95%.

The "nucleic acid" can be defined as including deoxyribonucleotide or ribonucleotide polymers in either single- or double-stranded form (DNA and/or RNA). An important tool for transforming microorganisms cells suitable to produce the sesquiterpene synthase is an expression vector comprising a nucleic acid. An "expression vector" as used herein includes any linear or circular recombinant vector including but not limited to plasmids, phagemids, phages, cosmids, artificial bacterial or artificial yeast chromosomes, and knock-out or knock-in constructs. The skilled person is capable of selecting a suitable vector according to the expression system.

A bacterial or yeast cell may be transformed by exogenous or heterologous DNA when such DNA has been introduced inside the cell. The transforming DNA may or may not be integrated, i.e. covalently linked into the genome of the cell. In prokaryotes, and yeast, for example, the transforming DNA may be maintained on an episomal element such as a plasmid. With respect to eukaryotic cells, a stably transfected cell is one in which the transfected DNA has become integrated into a chromosome so that it is inherited by daughter cells through chromosome replication. This stability is demonstrated by the ability of the eukaryotic cell to establish cell lines or clones comprised of a population of daughter cells containing the transforming DNA.

In the context of the present invention, bacteria (for example *Escherichia coli*) can be transformed with, for example, recombinant bacteriophage DNA, plasmid DNA, bacterial artificial chromosome, or cosmid DNA expression vectors. Yeasts (for example *Saccharomyces cerevisiae*) can be transformed with, for example, recombinant yeast expression vectors containing the polynucleotide molecule of the disclosure. Depending on the microorganism and the respective vector used, the polynucleotide can integrate, for example, into the chromosome or the mitochondrial DNA or can be maintained extrachromosomally like, for example, episomally or can be only transiently comprised.

The suitability of a microorganism for use according to the present invention may be determined by simple test procedures using well known methods. For example, the microorganism to be tested may be propagated in a rich medium (e.g. LB-medium, Bactotryptone yeast extract medium or nutrient medium) at a pH, temperature and under aeration conditions commonly used for propagation of the microorganism. Once a microorganisms is selected that produces the desired products of bioconversion, the products are typically produced by a production cell line on the large scale by suitable expression systems and fermentations, i.e. by microbial production in cell culture.

For cell cultivation, a defined minimal medium such as M9A can be used. The components of M9A medium comprise: 14 g/L $KH_2PO_4$, 16 g/L $K_2HPO_4$, 1 g/L $Na_3Citrate·2H_2O$, 7.5 g/L $(NH_4)_2SO_4$, 0.25 g/L $MgSO_4·7H_2O$, 0.015 g/L $CaCl_2·2H_2O$, 5 g/L glucose and 1.25 g/L yeast extract. On the other hand, a nutrient rich medium such as LB can be used. The components of LB medium comprise: 10 g/L tryptone, 5 g/L yeast extract and 5 g/L NaCl.

The microorganism may be grown in a batch, fed batch or continuous process or combinations thereof. Typically, the microorganism is grown in a fermenter at a defined temperature(s) in the presence of a suitable nutrient source for a desired period of. As used herein, the term "batch cultivation" is a cultivation method in which culture medium is neither added nor withdrawn during the cultivation. As used herein, the term "fed-batch" means a cultivation method in which culture medium is added during the cultivation but no culture medium is withdrawn.

The process according to the present invention can further comprise the step of purifying the α-guaiene prior to the production of rotundone, in particular by distillation or chromatography. Advantageously, the α-guaiene used for producing rotundone has a purity of 10 to 95%, preferably 20 to 80%, more preferably 30 to 70%.

In a process according to the present invention, rotundone can be produced from α-guaiene by an oxidation selected from the group consisting of transition metal catalysis, organocatalysis, chromium oxidation, selenium oxidation, manganese oxidation, aerial oxidation, enzymatic oxidation, electrochemical oxidation and combinations thereof. This bestows significant flexibility with regard to the means available to effect this transformation.

In order to avoid any ambiguity, in the context of the present invention, "oxidation of α-guaiene at the C(3) position", is not only to be understood as a direct oxidation of the methylene group at the C(3) position of α-guaiene to the corresponding carbonyl group. This transformation can also refer to a process, wherein the carbonyl group is formed stepwise via an intermediate, for instance a secondary alcohol. Depending on the method used, this intermediate can be isolated and further transformed into rotundone.

In the context of the present invention "aerial oxidation" is to be understood as any oxidation with molecular oxygen ($O_2$), either in pure or dilute form, for instance as air.

When rotundone is produced from α-guaiene by transition metal catalysis, the transition metal can be selected from the group costing of iron, copper, vanadium, manganese, molybdenum, cobalt, ruthenium, palladium, iridium, rhodium, titanium, chromium, gold, osmium and combinations thereof. With these transition metals, high selectivities for the product rotundone and good yields can be achieved.

In particular, rotundone can be produced from α-guaiene by iron porphyrin catalysis comprising the steps of:
  Forming a mixture containing α-guaiene and an iron (III)-X porphyrin complex catalyst in a solvent;
  Introducing molecular oxygen into the mixture;
  Effecting production of rotundone by oxidation of the C(3) position of α-guaiene.

Iron porphyrin catalysis provides an efficient method for the transformation of α-guaiene to rotundone with good selectivies and yields. Molecular oxygen ($O_2$) is a superb stoichiometric oxidant that is readily available, cost-efficient, environmentally friendly and save to handle. Also the iron (III)-X porphyrin complex catalysts show a low toxicity and can be used with a low catalyst loading. Furthermore, the odor profiles of the crude products are such, that the odor of rotundone is not adversely affected by byproducts. As a consequence of this, depending on the application, the products obtained can be used in the perfume and flavor industry without purification of rotundone. If however, the rotundone obtained is to be purified, this can be achieved through a simple distillation or by column chromatography.

In the above-described iron porphyrin catalysis, X can be selected from Cl, Br, I, mesylate, triflate and carboxylates, preferably Cl, Br and I. Especially Cl is preferred, as with this anion, a variety of iron (III)-X porphyrin complex catalysts can be obtained at low costs from commercial sources with different substitution patterns at the porphyrin system.

In the above-described iron porphyrin catalysis, the mixture can additionally contain a base coordination compound, preferably an N-heterocycle, more preferably imidazole. This has the advantage that better yields and purities are achieved after short reaction times.

On one hand, the step of introducing molecular oxygen into the mixture can comprise bubbling oxygen gas into the mixture. On the other hand, the step of introducing molecular oxygen into the mixture can also comprise bubbling air into the mixture.

Another option for introducing molecular oxygen into the mixture is to heavily stir the mixture under an oxygen containing atmosphere. It has been found that good results can be achieved in the above-described iron porphyrin catalysis by the introduction of either air or molecular oxygen into the reaction mixture. Air as the source of molecular oxygen has the further advantage that it is abundantly available at low cost. Furthermore it is operationally safe.

Although not required, the process may include exposing the mixture to electromagnetic radiation, preferably UV light radiation or radiation in the visible range of the electromagnetic spectrum. The wavelength range of electromagnetic radiation used to expose the mixture may be in the range of about 200 nm to about 800 nm. Alternatively, the process may be carried out in the dark or under ambient light conditions. The possibility to choose among these options allows the choice of the most suitable setup for industrial production.

In the iron porphyrin catalysis, the solvent can be selected from the group consisting of water, acetone, ethanol, 2-propanol, ethyl acetate, isopropyl acetate, methanol, methyl ethyl ketone, 1-butanol, tert-butanol and mixtures thereof, preferably an ethanol/water mixture. These solvents can be either discarded without environmental damage or easily recycled after use. An ethanol/water mixture has the further advantage that rotundone can be obtained in particular good yield and purity. Furthermore, with an ethanol:water ratio of less than 1:1, a non-flammable mixture can be achieved.

On the other hand, the solvent can also be selected from the group consisting of cyclohexane, heptane, toluene, methylcyclohexane, methyl tert-butyl ether, isooctane, acetonitrile, xylenes, dimethyl sulfoxide, acetic acid, ethylene glycol and mixtures thereof.

Preferably, the catalyst is an iron (III) porphyrin complex catalyst, having a chloride counter-ion. Furthermore, the porphyrin complex can be a tetraphenylporphyrin complex. Specifically, the catalyst can be chloro(tetraphenylporphyrinato)iron(III). Using this catalyst, superb results with respect to selectivity, yield and product purity can be achieved. Furthermore, as mentioned above, this catalyst is cost-effective and available from commercial sources. However, catalysts of this type with different substitution patterns at the porphyrin can be easily and nearly quantitatively prepared from even less expensive components $Fe(II)Cl_2$ and the porphyrine ligand. In addition, chloro(tetraphenylporphyrinato)iron-(III) can be employed with low catalyst loadings. Furthermore, hemine chloride can be used as an iron (III)-X porphyrin complex catalyst.

Alternatively, rotundone can be produced from α-guaiene by cobalt catalysis, in particular comprising the steps of:
Forming a mixture containing α-guaiene and at least one cobalt (II) complex catalyst, preferably selected from the group consisting of cobalt(II) ethylhexanoate, cobalt(II) acetylacetonate, cobalt(II) naphthenate and mixtures thereof, in particular in the presence of 4-methyl-2-pentanone, in a solvent;
Introducing molecular oxygen into the mixture;
Effecting oxidation of the C(3) position of α-guaiene.

As yet another alternative, rotundone can be produced from α-guaiene by chromium oxidation, in particular comprising the steps of:
Forming a mixture containing α-guaiene and at least one chromium reagent, preferably a chromium (VI) reagent, in particular selected from the group consisting of pyridinium chlorochromate, pyridinium fluorochromate, pyridinium dichromate, chromium trioxide, sodium chromate and mixtures thereof, preferably in the presence of celite, in a solvent;
Effecting oxidation of the C(3) position of α-guaiene.

With this method, rotundone can be obtained in good yield and purity.

Moreover, rotundone can be produced from α-guaiene by organocatalysis, in particular comprising the steps of:
Forming a mixture containing α-guaiene, an organocatalyst, preferably selected from the group consisting of N-hydroxyphthalimide and tetrachloro-N-hydroxyphthalimide, and an oxidant in a solvent;
Effecting oxidation of the C(3) position of α-guaiene.

Through organocatalysis, production of rotundone from α-guaiene can be achieved without the use of expensive and potentially harmful heavy metal catalysts. This process is therefore cost-efficient, environmentally friendly and operationally safe.

In the organocatalysis, the oxidant can be selected from the group consisting of tert-butyl hydroperoxide, hydrogen peroxide, dibenzoyl peroxide, di-tert-butyl peroxide, sodium chlorite, molecular oxygen and mixtures thereof. All of these oxidants are bulk chemicals that are readily available and safe in use. Sodium chlorite and molecular oxygen have the further advantage that work-up of the reaction is particularly facile.

In the context of the present invention, rotundone can also be produced from α-guaiene by electrochemical oxidation, in particular comprising the steps of:
Forming a mixture containing α-guaiene, an electrochemical mediator, preferably selected from the group consisting of N-hydroxyphthalimide and tetrachloro-N-hydroxyphthalimide, and an electrolyte in a solvent;
Applying an electrical current to the mixture;
Effecting oxidation of the C(3) position of α-guaiene.

A representative example of electrochemical oxidation is described in *Nature* 2016, 533, 77-81. It allows for the production of rotundone from α-guaiene in good yield and selectivity. By electrochemical oxidation, no or less stoichiometric oxidants need to be used and the generation of waste products is reduced.

In the above-described electrochemical oxidation, the mixture can additionally contain a base, preferably selected from the group consisting of pyridine, 2,6-lutidinie, 2,4,6-collidine, trimethylamine, DBU and mixtures thereof. The solvent can be selected from the group consisting of acetone, acetonitrile, dichloromethane, pyridine and mixtures thereof. The electrolyte can be selected from the group consisting of $LiBF_4$, $LiClO_4$ and mixtures thereof.

Furthermore, in the above-described electrochemical oxidation, the mixture additionally contains a co-oxidant, preferably selected from the group consisting of tert-butyl hydroperoxide, hydrogen peroxide, dibenzoyl peroxide, di-tert-butyl peroxide and mixtures thereof. By use of a co-oxidant increased yields can be achieved.

Apart from chemical synthesis, rotundone can also be produced from α-guaiene by enzymatic oxidation, in particular through an enzyme selected from the group consisting of a cytochrome P450, preferably an α-guaiene 3-oxidase cytochrome P450, a laccase, a Rieske non-heme dioxygenase and combinations thereof. An α-guaiene 3-oxidase cytochrome P450 (referred therein as "α-guaiene 2-oxidase VvSTO2") has been described in *J. Exp. Bot.* 2016, 67, 787-798. This enzyme has been shown to exhibit excellent substrate-specificity and selectivity.

An oxidation of α-guaiene at the C(3) position with the above-mentioned enzymes can also lead to a corresponding secondary alcohol. This intermediate can be further oxidized to rotundone using various methods, for instance oxidation with an alcohol oxidase or an alcohol dehydrogenase.

A process according to the present invention can further comprise the step of purifying the rotundone produced. This can be effected by distillation or chromatography. Distillation has the advantage that it can be performed at low cost on large scales. The advantage of chromatography is that material with a particularly high purity can be obtained.

The present invention also refers to a use of α-guaiene for producing rotundone, in particular by oxidation of the C(3) position, wherein the α-guaiene is produced from a precursor, in particular an acyclic precursor, by a sesquiterpene synthase, wherein the sesquiterpene synthase is produced in a microorganism.

A further aspect of the present invention relates to a fragrance or flavor ingredient obtainable by the process as stated hereinabove.

The present invention also refers to a fragrance or flavor ingredient, in particular an ingredient as described hereinabove, wherein the portion of rotundone is in a range of 10 to 95 wt.-%, preferably 20 to 70 wt.-%, even more preferably 25 to 50 wt.-%.

The fragrance or flavor ingredient can additionally contain ketone 5.

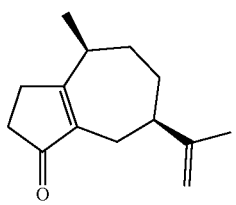

5

In such a fragrance or flavor ingredient, the weight-ratio of rotundone to ketone 5 can be in a range of 20:1 to 1:1, preferably 10:1 to 2:1, even more preferably 5:1 to 3:1.

The present invention also relates to a consumer product containing a fragrance or flavor ingredient as stated herein above and to the use of such a fragrance or flavor ingredient.

The present invention also refers to a process for producing a fragrance or flavor composition and/or a consumer product, the process comprising the production of rotundone from α-guaiene by a process as described herein above.

Further aspects and particular features of the present invention become apparent from the following description of representative embodiments.

ANALYTICAL METHODS EMPLOYED

Polar GCMS:
35° C./2 min, 10° C./min to 50° C., 2.5° C./min to 240° C., 240° C./5 min. Thermo Scientific TSQ8000evo+Trace 1310 system. Polar column: Varian VF-WAX (polar, PEG phase). Column dimensions: 30 m length, 0.25 mm ID, 0.25 μm film thickness. Injector: splitless. Flow: 1.2 mL/min. Carrier gas: Helium. Injection volume: 1 μl. Injector temperature: 230° C. Transfer line: 250° C. MS-quadrupol: 160° C. MS-source: 230° C. Ionization mode: Electron Impact (EI) at 70 eV.

By this method, the products obtained were identified. Minor and unidentified byproducts were neglected and their percentages (usually <10%) are not given. Apart from α-guaiene 1 and rotundone 2, side products included rotundol 3, epoxy-guaiene 4, ketone 5, hydroxy-rotundone 6, and corymbolon 7.

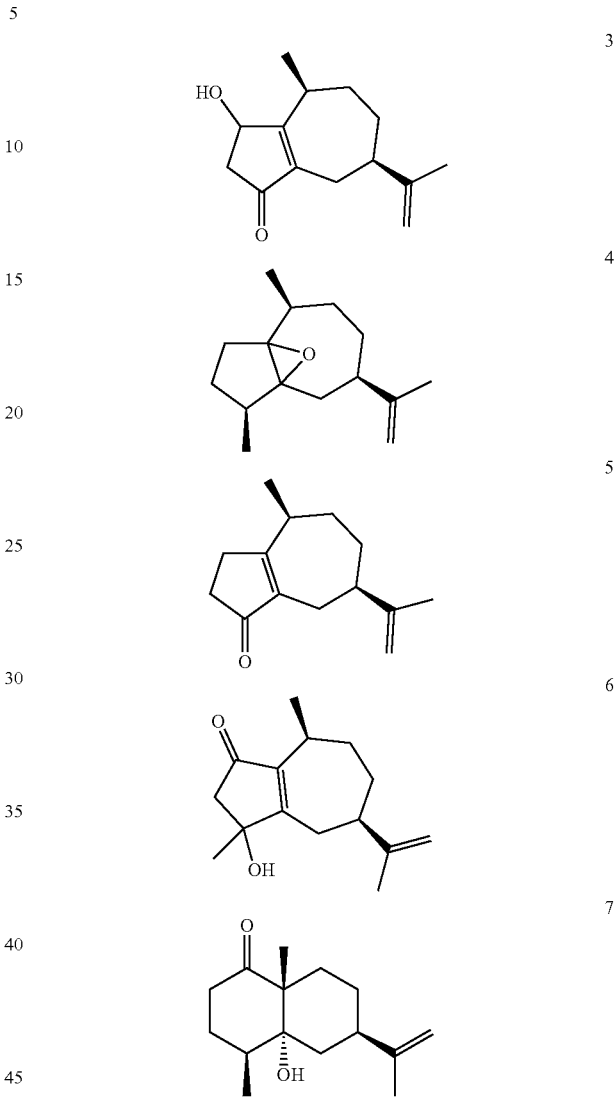

Components 1-7 as defined herein below are literature-known apart from ketone 5 which was isolated and its structure confirmed.

Nonpolar GC:
100° C./2 min, 15° C./min to 240° C., 240° C./5 min. Thermo Focus GC. Nonpolar column: Agilent Technologies J&W Scientific DB-5 (nonpolar, 5% phenylmethylpolysiloxane). Column dimensions: 30 m length, 0.32 mm ID, 0.25 μm film thickness. Injector: Split. Injector temperature: 240° C. Detector: FID. Detector temperature: 270° C. Injection volume: 1 μl. Carrier gas: Helium. Split ratio: 1/42.3. Pressure: 70 kPa. Integrator: Hewlett Packard.

By this method, substrate purity, conversion and GC-purities of rotundone 2 after distillation were determined (% rpa).

Source of α-Guaiene
α-Guaiene was isolated from Clearwood™ by repeated distillation with purities of 37% to 85%. The purities were determined by GC and NMR with internal standard anisaldehyde. The other constituents were seychellene 33%), α-patchoulene 25%), and γ-patchoulene 5%). The purity was determined by GC and NMR with internal standard anisaldehyde.

Clearwood™ (CAS 1450625-49-6) is a perfumery ingredient in the patchouli, woody family and commercially available from Firmenich. This mixture of sesquiterpenes, which contains about 14 wt.-% of α-guaiene 1, is obtained by fermentation of sugars (IP.com Technical Disclosure IPCOM000233341D).

Examples for the biotechnological production of α-guaiene 1 are also given in *Plant Physiol.* 2010, 154, 1998-2007; *Arch. Biochem. Biophys.* 2006, 454, 123-136 and WO 2005/052163 A2.

Preparation of Rotundone 2 from α-Guaiene 1 (Iron Porphyrin Catalysis)

Chloro(tetraphenylporphyrinato)iron(III) (17 mg, 0.024 mmol) and imidazole (6.7 mg, 0.1 mmol) were added to α-guaiene 1 (61% ex Clearwood™, 1 g, 3 mmol) in a 1:1 ethanol/water mixture (20 mL) under stirring. Oxygen was bubbled into the greenish turbid mixture at 45° C. After 30 min the oxygen inlet was replaced by an oxygen balloon. After 5 hours GC indicated complete conversion to a mixture containing of, rotundone 2 (24%), epoxy-guaiene 4 (3%), ketone 5 (6%), hydroxy-rotundone 6 (4%), seychellene 8 (37%). The dark-brown mixture was evaporated partially under reduced pressure and the residue extracted with tert-butyl methyl ether. The combined organic layers were dried over $MgSO_4$, filtered and evaporated. The residual brown oil (1.22 g) was bulb-to-bulb distilled at 150-230° C./0.03 mbar, giving 0.88 g rotundone 2 of 32% GC-purity (43% corr. yield) as a red-brown oil and 0.18 g of a brown residue.

Preparation of Rotundone 2 from α-Guaiene 1 (Organocatalysis)

In a 100 mL round-bottom two-necked flask equipped with a condenser, α-guaiene 1 (37% ex Clearwood™, 1.022 g, 1.85 mmol) and NHPI (0.082 g, 0.5 mmol) were dissolved in acetonitrile (30 mL) and water (15 mL) under positive nitrogen flow. The solution was heated to 50° C., and solid $NaClO_2$ (0.678 g, 7.5 mmol) was added in portions. The reaction mixture was then allowed to stir at 50° C. for 21 h. Then, the solution was allowed to cool to room temperature and poured onto NaOH (aqueous, 2M). The product was extracted with MTBE and washed with brine. The combined organic layers were dried over $MgSO_4$, filtered and evaporated. GCMS of the residue (0.92 g) indicated complete conversion to a mixture containing rotundone 2 (6%), rotundol 3 (1%), epoxy-guaiene 4 (1%), ketone 5 (1%), hydroxy-rotundone 6 (2%), seychellene (40%), α-patchoulene (11%), α-patchoulenone (2%) and β-patchoulenone (2%) The residual brown oil (0.92 g) was bulb-to-bulb distilled at 160-220° C./0.01 mbar, giving 0.92 g rotundone 2 of 17% GC-purity (33% corr. yield) as a red-brown oil and 90 mg of a brown residue.

Olfactory Description of Rotundone 2

(from iron porphyrin catalysis as described herein above, purified by distillation, dilution 1% in ethanol on blotter dipped freshly, after 4 h and after 1 week)

| Time | Olfactory Description |
|---|---|
| 2 minutes | fresh, woody, cedarwood, terpenic, wood fiber, slightly minty and terpinol |
| 4 hour | warm, woody, spicy, cedar wood like, wood fiber, sawdust, straw |
| 1 week | cedar wood like, wood fiber, sawdust, straw |

Synthesis and Purification of Ketone 5

Oxygen was bubbled into a mixture of chloro(tetraphenylporphyrinato) iron(III) (34 mg, 0.05 mmol), imidazole (6.7 mg, 0.1 mmol) and α-guaiene 91% (1 g, 4.5 mmol) in polyethylenglycol (20 mL) under stirring, light irradiation with a 300 W Osram Ultra Vitalux lamp and at 45° C. After 38 hours, GCMS indicated a quantitative conversion to a mixture of rotundone 2 (27%), epoxy-guaiene 4 (6%), ketone 5 (11%), hydroxy-rotundone 6 (19%), corymbolon 7 (1%). The orange product mixture was extracted with tert-butyl methyl ether against water. The combined organic layers were dried over $MgSO_4$, filtered and evaporated to 0.7 g of an orange oil, which was purified by flash chromatography over 30 g silica gel 15-40 μm using an hexane/ethyl acetate gradient 98:2-50:50. After evaporation of the solvents this gave 0.23 g of rotundone 2 with 52-59% GC-purity (13% corr) and 24 mg of Ketone 5 with a GC-purity of 71% (2% corr). Ketone 5 was further purified by preparative GC to a purity of >99.5% (containing less than 0.03% of rotundone 2) and its odor analyzed on blotter and by sniff-GC being woody, cedary, dry, isoraldeine-guaiac, smokey, fruity, spicy.

Analytical data of ketone 5 ((4S,7R)-4-methyl-7-(prop-1-en-2-yl)-3,4,5,6,7,8-hexahydroazulen-1(2H)-one): $^1$H-NMR (benzene-$D_6$, 400 MHz): 4.85-4.9 (2s, 2H), 3.1-3.14 (2 h), 2.5-1.4 (10H), 1.75 (s, 3H), 0.9 (d, 3H) ppm; $^{13}$C-NMR (benzene-$D_6$, 100 MHz): 206.5 (s), 176.6 (s), 150.3 (s), 139.0 (s), 108.9 (t), 45.2 (d), 36.4 (d), 33.8 (t), 32.1 (t), 30.9 (t), 29.5 (t), 28.1 (t), 20.4 (q), 16.5 (q) ppm; $^{13}$C-NMR ($CDCl_3$, 100 MHz): 209.3 (s), 179.9 (s), 150.6 (s), 139.2 (s), 108.9 (t), 45.3 (d), 36.85 (d), 34.3 (t), 32.3 (t), 31.0 (t), 30.15 (t), 27.2 (t), 20.6 (q), 17.0 (q) ppm; IR ($cm^{-1}$): 2661 (w), 2922 (m), 2854 (w), 1697 (s), 1642 (m), 1452 (w), 1438 (w), 1375 (w), 1304 (w), 1286 (w), 1260 (w), 1236 (w), 1173 (w), 1154 (w), 1071 (w), 1042 (w), 1023 (w), 992 (w), 886 (m), 532 (w); GCMS (EI, m/z): 204 (2%, [M]$^+$), 189 (11%, [M−15]$^+$), 161 (12%), 148 (51%), 147 (48%), 134 (10%), 133 (100%), 121 (18%), 119 (28%), 107 (19%), 106 (11%), 105 (43%), 93 (25%), 91 (18%), 91 (39%), 81 (34%), 81 (17%), 79 (27%), 77 (22%); $[\alpha]_D^{22}$=−11.4 (c 0.35, $CHCl_3$); HRMS (ESI): Calculated for $C_{14}H_{21}O$ [M+H]$^+$: 205.1587; Found: 205.1586.

The invention claimed is:

1. A fragrance or flavor ingredient comprising rotundone in an amount of about 10 to about 95 wt. % and ketone 5:

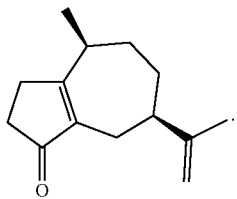

2. The fragrance or flavor ingredient according to claim 1, wherein the rotundone is in an amount of about 20 to about 70 wt. %.

3. The fragrance or flavor ingredient according to claim 1, wherein the rotundone is in an amount of about 10 to about 50 wt. %.

4. A process of making the fragrance or flavor ingredient of claim 1 comprising producing the rotundone from α-guaiene is produced from a precursor by a sesquiterpene synthase, wherein the sesquiterpene synthase has a sequence identity with SEQ ID NO: 2, SEQ ID NO: 4, or SEQ ID NO: 6 of at least 70%, and wherein the sesquiterpene synthase is produced in a microorganism.

5. The process of claim 4, wherein the sesquiterpene synthase has a sequence identity with SEQ ID NO.: 2, SEQ ID NO.: 4 or SEQ ID NO.: 6 of at least 80%.

6. The process of claim 4, wherein the sesquiterpene synthase has a sequence identity with SEQ ID NO.: 2, SEQ ID NO.: 4 or SEQ ID NO.: 6 of at least 90%.

7. The process of claim 4, wherein the sesquiterpene synthase has a sequence identity with SEQ ID NO.: 2, SEQ ID NO.: 4 or SEQ ID NO.: 6 of at least 95%.

8. A consumer product comprising the fragrance or flavor ingredient according to claim 1.

9. A method of using the fragrance or flavor ingredient of claim 1 to impart at least one of a peppery or woody aroma.

10. The fragrance or flavor ingredient according to claim 1, wherein the weight ratio of rotundone to ketone 5 ranges from about 20:1 to about 1:20.

11. The fragrance or flavor ingredient according to claim 1, wherein the weight ratio of rotundone to ketone 5 ranges from about 10:1 to about 2:1.

12. The fragrance or flavor ingredient according to claim 1, wherein the weight ratio of rotundone to ketone 5 ranges from about 5:1 to about 3:1.

* * * * *